United States Patent [19]

Gurney

[11] Patent Number: 4,758,131
[45] Date of Patent: Jul. 19, 1988

[54] APPARATUS FOR DISPLACING HIGH VISCOUS SUBSTANCES

[76] Inventor: Richard S. Gurney, 6 Umfolozi Dr., Dundee, Natal Province, South Africa

[21] Appl. No.: 38,030

[22] Filed: Apr. 14, 1987

[30] Foreign Application Priority Data

Apr. 14, 1986 [ZA] South Africa ............... 86/2771

[51] Int. Cl.⁴ .................. F04B 3/00; F04B 49/02; F04B 19/20; F16N 7/14
[52] U.S. Cl. .................. 417/259; 417/305; 417/307; 417/460; 417/514; 184/26
[58] Field of Search ........ 417/259, 457, 460, 469, 417/511, 514, 520, 307, 305, 254; 184/26, 28

[56] References Cited

U.S. PATENT DOCUMENTS

| | | | |
|---|---|---|---|
| 829,096 | 8/1906 | Carver | 417/460 |
| 2,409,962 | 10/1946 | Shearman | 417/460 |
| 2,899,017 | 8/1959 | Liljemark | 417/460 |
| 3,254,607 | 6/1966 | Norton | 417/511 |
| 3,868,048 | 2/1975 | Soodalter | 417/457 |
| 4,239,460 | 12/1980 | Golz | 417/259 |
| 4,249,868 | 2/1981 | Kotyk | 417/457 |

FOREIGN PATENT DOCUMENTS 2462587 3/1981 France ............... 417/469
731566 6/1955 United Kingdom ......... 417/258

Primary Examiner—William L. Freeh
Attorney, Agent, or Firm—St. Onge Steward Johnston & Reens

[57] ABSTRACT

An apparatus for displacing a high viscous substance, such as grease, which comprises a positive displacement-type pump. The chamber of the pump is in communication with a second chamber defined by a tubular sleeve that is slidably displaceable on the body of the pump, thereby rendering the volume of the second chamber variable and, as such, providing for effective displacement of grease into the chamber of the pump via a valve arrangement. A closure member is disposed to control charging of the second chamber with grease and the displacement of such grease from the second chamber into the chamber of the pump. Also, simultaneously with the charging of the chamber the pump can displace grease therefrom for lubricating or other applications.

14 Claims, 5 Drawing Sheets

APPARATUS FOR DISPLACING HIGH VISCOUS SUBSTANCES

BACKGROUND OF THE INVENTION

This invention relates to an apparatus for displacing high viscous substances such as lubricating grease, and the like.

Difference types of apparatus for displacing grease, also known as grease guns, are known. It is also known that by their very nature high viscous products are difficult to displace. The known apparatus generally incorporate the principles of a positive displacement pump and this requires the need to displace a high viscous product through an inlet valve arrangement, for charging the pump, which has always proved difficult.

Three basic types of grease guns are commonly known. The first type comprises a small hand type which includes a cylindrical reservoir, which is typically four to five times as long as its diameter, which is fitted with a spring loaded plunger. The stored grease is trapped between the spring loaded plunger and the head, which includes a conventional positive displacement pump. The reaction of the spring against the plunger causes an elevation in the pressure within the reservoir. As the pump is activated, a low pressure area is created in the vicinity of the inlet valve which permits the passage of grease into the pump. This low pressure area, together with the pressure created in the reservoir, is then sufficient for grease to flow through the restriction caused by the inlet valve and thereby permits the pump to be charged. The main disadvantage of this particular grease gun is that it has a relatively small reservoir capacity and a short life expectancy.

The second type of grease gun that is well known is generally known as the manually operable pail type. Here the grease is contained within a pail, typically 10 to 20 liters in capacity, which remains at atmospheric pressure. This grease gun also incorporates a displacement pump, the main feature of the pump being that the inlet valve leading into the pump can be manually opened during the inlet stroke of the pump whereby the restriction to the passage of grease into the pump is greatly reduced. A paddle arrangement is further provided which can elevate the pressure in the vicinity of the inlet port leading via the inlet valve and which can urge grease towards the inlet valve. The main disadvantages of the pail type grease gun are that they produce relatively low delivery pressures, have only a medium life expectancy and have not proved entirely reliable.

The third type of grease gun that is known is the pneumatically operable type and the main disadvantage of this type is that they are very expensive, are expensive to maintain and require a source of compressed air for their operation. Their portability is therefore greatly limited.

It is accordingly an object of the present invention to provide an improved apparatus for displacing high viscous substances and, in particular, grease.

SUMMARY OF THE INVENTION

According to the invention there is provided an apparatus for displacing a high viscous substance, which includes an elongate support body defining a first chamber therein, an inlet opening defined at one end of the support body leading into the first chamber and an elongate passage leading into the first chamber from the opposite end of the body;

a tubular sleeve that is slidably located on the support body and defines an inlet end which can extend beyond the end of the support body defining the inlet opening, a second chamber being defined by the tubular sleeve between its inlet end and the end of the support body located within the sleeve, the volume of the chamber being variable through the displacement of the support body with respect to the tubular sleeve;

an elongate rod located within the passage defined by the support body, so that the body is slidably located on the rod, the rod defining an elongate passage therein leading from an inlet end, at one end of the rod which is in direct communication with the first chamber defined by the support body, and an outlet end, defined near the opposite end of the rod where it extends from the support body, the rod being disposed so that it can extend into the first chamber by the suitable displacement of the support body located thereon;

a one-way control valve located within the support body, being operable to permit the displacement of a high viscous substance into the first chamber, defined by the support body, from the second chamber, defined by the tubular sleeve, and inhibit displacement of such a substance in an opposite direction;

a closure member for blocking-off the inlet end of the tubular sleeve at a predetermined position thereof;

a first displacement control means which permits initial displacement of the sleeve together with the support body away from the closure member for a limited distance, so that the inlet end of the sleeve is thereby displaced from the closure member, and thereafter inhibits displacement of the sleeve while displacement of the support body with respect to the sleeve can occur; and manually operable second displacement means for reciprocably displacing the elongate support body with respect to the sleeve and the rod.

The apparatus of the invention may further include a container, for containing a high viscous substance, and a mounting formation secured to the container near its operative bottom end, the mounting formation mounting the free end of the elongate rod onto the container near the operative bottom end of the container in a configuration in which the support body and sleeve are located within the container and the outlet end of the passage in the rod is located outside the container.

The mounting formation may have an outlet formation which is in communication with the outlet end of the passage defined by the rod, the outlet formation being connectable to a suitable conduit through which a high viscous substance can be displaced from the container towards a required location. The outlet formation of the mounting formation may have a one-way valve located therein which can control the passage of a high viscous substance from the container via the outlet formation and inhibit the return flow of the substance.

Further according to the invention, the closure member may be secured to the container at a location where it will block-off the inlet end of the tubular sleeve, with the support body displaced into a position with respect to the elongate rod in which the rod does not extend, or only extends marginally, into the first chamber defined by the support body, so that the volume of the first chamber is at its operative maximum, whereas the volume of the second chamber is at its operative minimum.

The one-way control valve located within the support body may be a spring loaded ball valve that can seat on a valve seat defined by the inlet opening leading into the first chamber of the support body.

Also, the closure member for blocking-off the inlet end of the tubular sleeve may be a formation that defines a sealing surface that opposes the tubular sleeve and can sealingly engage the tubular sleeve to thereby block-off the inlet end thereof.

The first displacement control means may include a control element that mechanically engages the sleeve and frictionally engages the support body so that the sleeve will ordinarilly move with the support body when displaced with respect to the elongate rod, the first displacement control means further including a stop member, which is secure with the container, and which can engage either the sleeve or the control element to thereby inhibit further displacement of the sleeve away from the closure member after initial displacement thereof, while displacement of the support body can continue in the same direction.

The manually operable second displacement means may be an arrangement that engages the support body and includes an operating arm that projects to an accessible location where, in the operative configuration of the apparatus, the operating arm is displaceable to provide for reciprocal displacement of the support body. More particularly, the displacement means may include a lever arrangement having a lever arm that is pivotally displaceable, in the operative configuration of the apparatus, and through its pivotal displacement will provide reciprocal displacement of the support body. Preferably, the displacement means will be foot-operable.

Still further according to the invention, the maximum volume of the first chamber defined by the support body may be smaller than the maximum volume of the second chamber defined by the tubular sleeve, and a release means is provided for releasing excess high viscous substance from the second chamber during charging of the first chamber, in use of the apparatus.

The release means may be provided by a concave bevelled front face of the tubular sleeve, which face defines the inlet end of the tubular sleeve, this bevelled front face being disposed so that pressure of substance within the chamber can act thereon to displace it away from the closure member and thereby permit release of excess substance from the second chamber via a gap so formed between the closure member and inlet end of the tubular sleeve. Alternatively, the release means may comprise a gap between the tubular sleeve and the support body through which excess substance can be released, or a suitable aperture or like formation defined within the wall of the tubular sleeve or closure member through which excess substance can similarly be released. Still alternatively, the closure member may be displaceable when a predetermined pressure from within the second chamber acts thereon, thus permitting the necessary release of substance. As such, the closure member may be pivotally secured within the container and be urged, against a predetermined spring loading, into its required position with respect to the tubular sleeve by means of the grease pressure acting on it.

Yet further according to the invention, the apparatus may include pressure relief means for relieving excess pressure in the outlet formation, the pressure relief means being located downstream of the one-way valve located in the outlet formation. The pressure relief means may be a pressure relief valve adapted to be activated automatically on a predetermined excess pressure being experienced in the outlet formation, and the apparatus may include means for manually activating the relief valve to release excess pressure, which may be below the predetermined pressure, in the outlet formation.

The operation of the apparatus of the invention including its benefits and uses will become clear from a description of a preferred embodiment of the invention described hereafter.

DESCRIPTION OF THE DRAWINGS

This invention is now described, by way of example, with reference to the accompanying diagrammatic drawings, in which.

DETAILED DESCRIPTION OF THE PREFERRED EMBODIMENT

Figure 1:
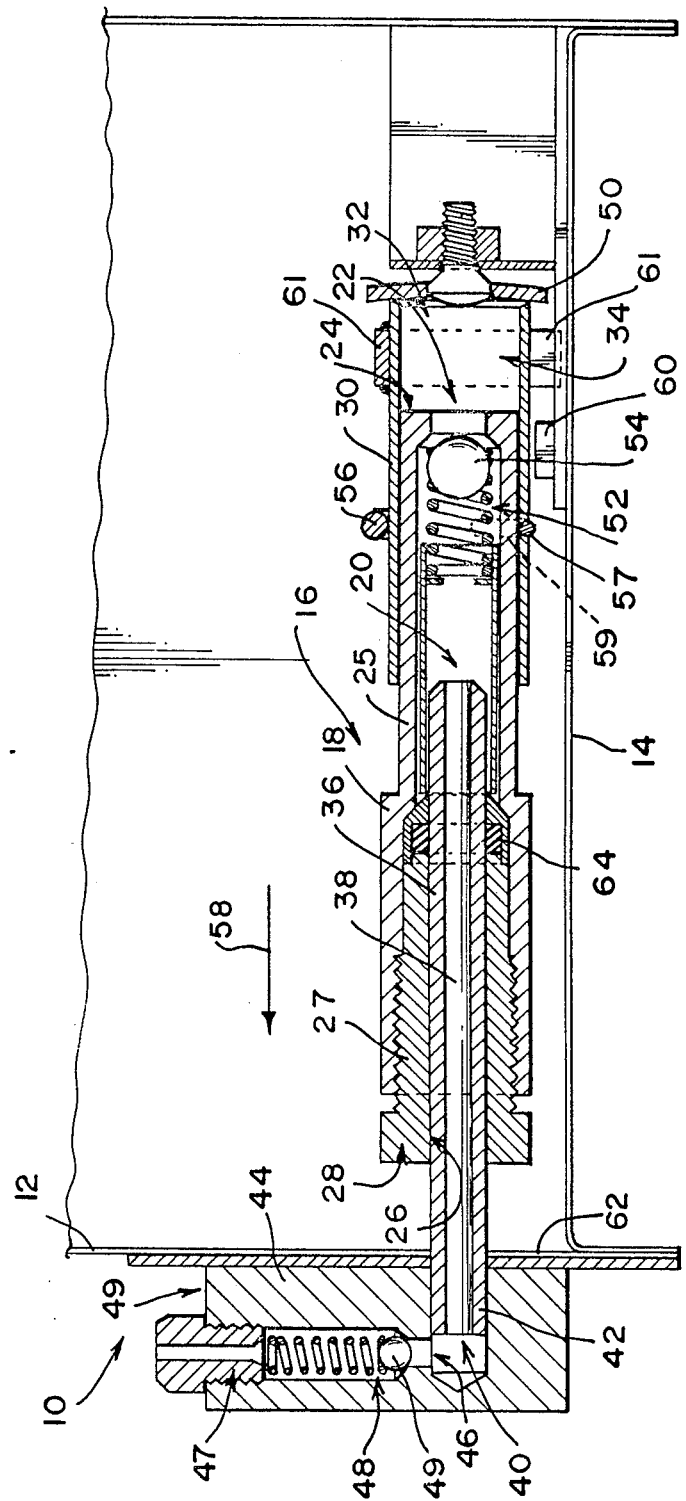
FIG. 1 shows a cross-sectional side view of an apparatus for displacing a high viscous substance, in accordance with the invention, the apparatus being shown in an intermediate operating position.

Referring to the drawings, an apparatus for displacing a high viscous substance, in accordance with the invention, is generally indicated by the reference numeral 10. It must immediately be noted that for the sake of clarity all the components and parts of the apparatus 10 are not shown and/or marked in all the drawings. For example, the foot operable displacement means for operating the apparatus 10 is only shown in FIG. 7.

The apparatus 10 preferably includes a container 12 (only partially shown), the actual displacement means for displacing high viscous substance from the container being secured immediately above the base 14 of the container 12, this displacement means being generally indicated by the reference numeral 16.

The displacement means 16 includes a support body 18 defining a first chamber 20 therein, an inlet opening 22, defined at the end 24 of the body 18, providing access into the chamber 20. A passage 26 is also defined within the body 18, leading into the chamber 20 from the end 28 of the body 18 opposite to the end 24. As is clear from FIG. 1, the body 18 may comprise two parts, 25 and 27 respectively, that screw together as shown.

The displacement means 16 further includes a tubular sleeve 30 that is located on the support body 18 in a manner that the support body is slidably displaceable within the sleeve 30. The sleeve 30 defines an inlet end 32 which can extend beyond the end 24 of the body 18. A second chamber 34 is thus defined within the sleeve between the closure member 50, as will be described hereafter, or the inlet end of the sleeve 32, and the end 24 of the body 18. By the displacement of the body 18 within the sleeve 30, the effective volume of the second chamber is clearly rendered variable.

An elongate rod 36 is located within the passage 26 of the body 18, the rod 36 having an elongate passage 38 defined along the length thereof, extending from an inlet end, which is in direct communication with the first chamber 20, to an outlet end 40, disposed near the opposite end of the rod 36, where it extends from the body 18. The end 42 of the rod 36 projects through a hole in the wall of the container 12 and is secured within a mounting formation 44 which is fixedly secured to the container 12 in the position as illustrated. The configuration of the mounting formation 44 and rod 36 is specifically such that an outlet formation 46, defined by the mounting formation 44, is in communication with the outlet end 40 of the passage 38, defined in the rod 36. A one way ball valve arrangement 48 is located within the mounting formation 44 and is disposed to prevent the return flow of high viscous susbstances toward the chamber 20, after having been displaced past the ball 49 of the valve arrangement 48. The mounting formation 44 clearly serves to mount the displacement means 16 within the container 12. A delivery port 47 defined at the end 49 of the formation 46 allows grease displaced from the container 12 to be delivered, via a suitable conduit, or the like, under pressure to a required location.

The inlet end 32 of the sleeve can abut against a closure member 50 during different positions thereof, as will be described hereafter, which effectively closes-off this end of the sleeve 30 when so positioned. The closure member 50 is secured within the container 12 and its position is thereby fixed. As is clear from the drawing, the closure member 50 is in the form of a convex disc, this convex configuration of the closure member providing for effective alignment between the end 32 of the tubular sleeve 30 and the closure member 50 and, as such, sealing engagement between this end of the sleeve 30 and the closure member 50 is achieved.

A one-way ball valve arrangement 52 is provided within the first chamber 20, for controlling the passage of a high viscous substance into the first chamber 20 from the second chamber 34, the arrangement 52 including a ball 54 that can seat on a valve seat defined by the inlet opening 22 of the body 18, so that the return flow of a high viscous substance from the first chamber 20 into the second chamber 34 is inhibited thereby. The closure member 50 and the end 24 of the body 18, including the valve arrangement 52, therefore serves to define the opposite ends of the chamber 34 within the sleeve 30.

Furthermore, a spring 56 engages a friction element 57, located within a slot 59 defined within the tubular sleeve 30 (see FIGS. 1, 3 and 4), the spring 56 urging the friction element 57 into engagement with the support body 18, so that displacement of the support body 18 with respect to the rod 36 will result in the simultaneous displacement of the sleeve 30 together with the support body 18. It will thus be understood that by displacement of the body 18 in the direction of arrow 58, the sleeve will move in unison in the same direction, its inlet end 32 thereby being displaced away from the closure member 50, thus opening the chamber 34 to surrounding grease that may be contained in the container 12. This displacement of the sleeve 30 will continue until a stop formation 61, secure with the sleeve 30, abuts a stop member 60, which is secured to the container 12, whereafter the displacement of the support body 18 can continue by overcoming the frictional engagement between the friction element 57 and the body 18 as it telescopes out of the stationary sleeve 30. Clearly, when the body is displaced in an opposite direction to the direction indicated by arrow 58, the sleeve will first move in unison with the body 18 until its inlet end 32 abuts the closure member 50, thus closing off the chamber 34 from the surrounding grease, whereafter displacement of the support body 18 can again continue by overcoming the frictional engagement produced between the friction element 57 and the support body 18, as it telescopes into the sleeve 30 until the end of the stroke, which is defined by the position of the body as shown in FIG. 2.

In use of the apparatus 10, the container will be filled with a high viscous substance, such as lubricating grease. By initially displacing the support body 18, from its position as shown in FIG. 2, in the direction of arrow 58, the inlet end 32 of the sleeve will be displaced from the closure member 50 and after this displacement is stopped by the stop member 60 acting against stop formations 61, the chamber will be open to the surrounding grease. As the body 18 continues to move to the position as shown in FIG. 3, a negative pressure will be created within the chamber 34. This negative pressure will draw grease into the chamber 34 through the relatively large inlet created at the end 32, which is particularly suitable for high viscous products. The displacement of the support body 18 can continue until it abuts the wall 62 (as shown in FIG. 3) of the container 12, thereby fully charging the chamber 34.

Thereafter, by displacing the support body 18 in an opposite direction to the arrow 58, the sleeve 30 will initially be displaced in unison with the support body 18 until its inlet end 32 abuts the closure member 50, thus closing off the chamber 34 from the surrounding grease. Thereafter, as the displacement of the body 18 continues, grease trapped in the chamber 34 will be forced into the first chamber 20 via the ball valve arrangement 52 (see FIG. 1), in which way the chamber 20 can be fully charged.

During the following stroke of the body 18 in the direction of arrow 58, two functions will occur simultaneously. Firstly, as grease has been trapped in the chamber 20, having passed via the one-way valve 52 as described above, and as the body 18 moves in the direction of arrow 58, the rod 36 penetrates the chamber 20 and displaces its own volume. As such, grease within the chamber 20 is forced down the passage 38 of the rod 36 through the valve 48 from where it can be displaced under pressure to any required location. Due to the mechanical advantage of the manual or mechanical force multiplied by the leverage divided by the piston area of rod 36, high pressure can be generated. Secondly, and simultaneously, as the body 18 moves in the direction of arrow 58, the chamber 34 is once again charged as described above.

In order to complete the cycle, as the body 18 is moved in the opposite direction to the arrow 58, grease in the chamber 34 will be transferred to the chamber 20 and, in this way, grease can be provided under pressure at a continuous and reliable rate. A seal 64 disposed between the body 18 and rod 36 ensures that no unnecessary leakage can occur via the gap between these two members.

Figure 2:
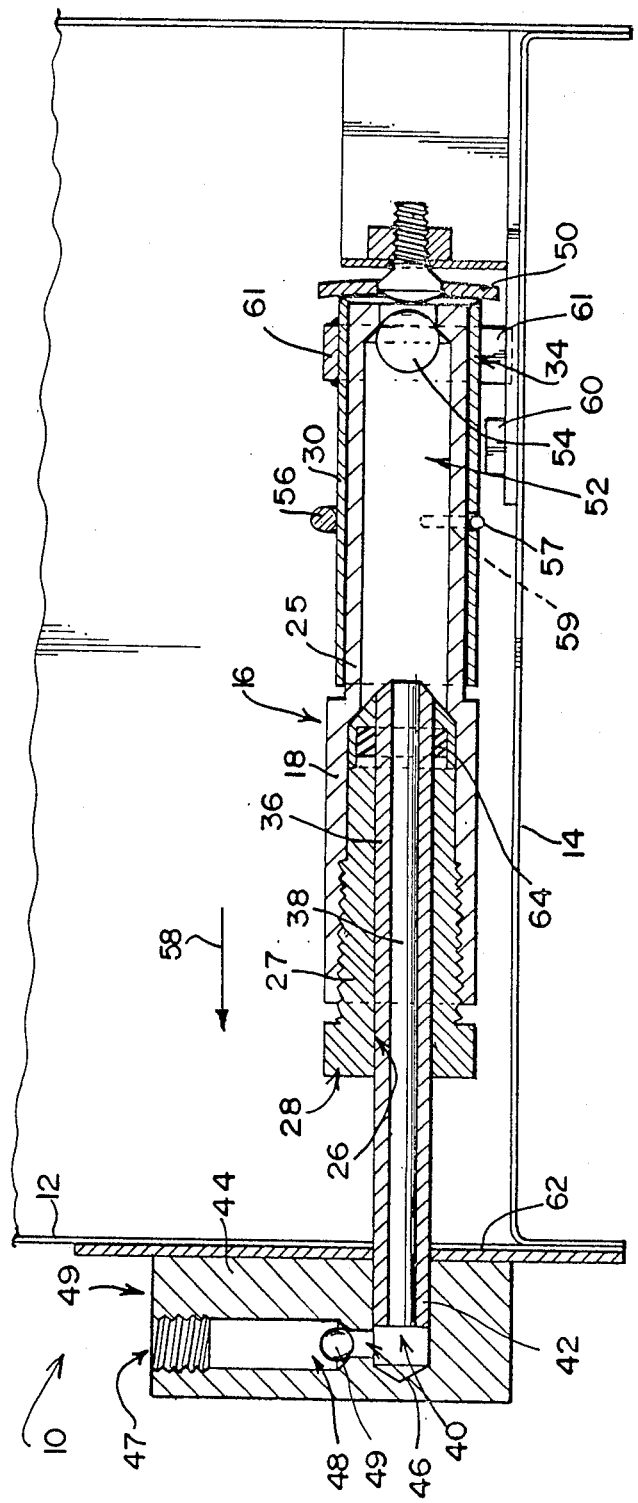
FIG. 2 shows a cross-sectional side view of the apparatus of FIG. 1 in an operative configuration which illustrates one limit position of the complete stroke of the apparatus.
Figure 3:
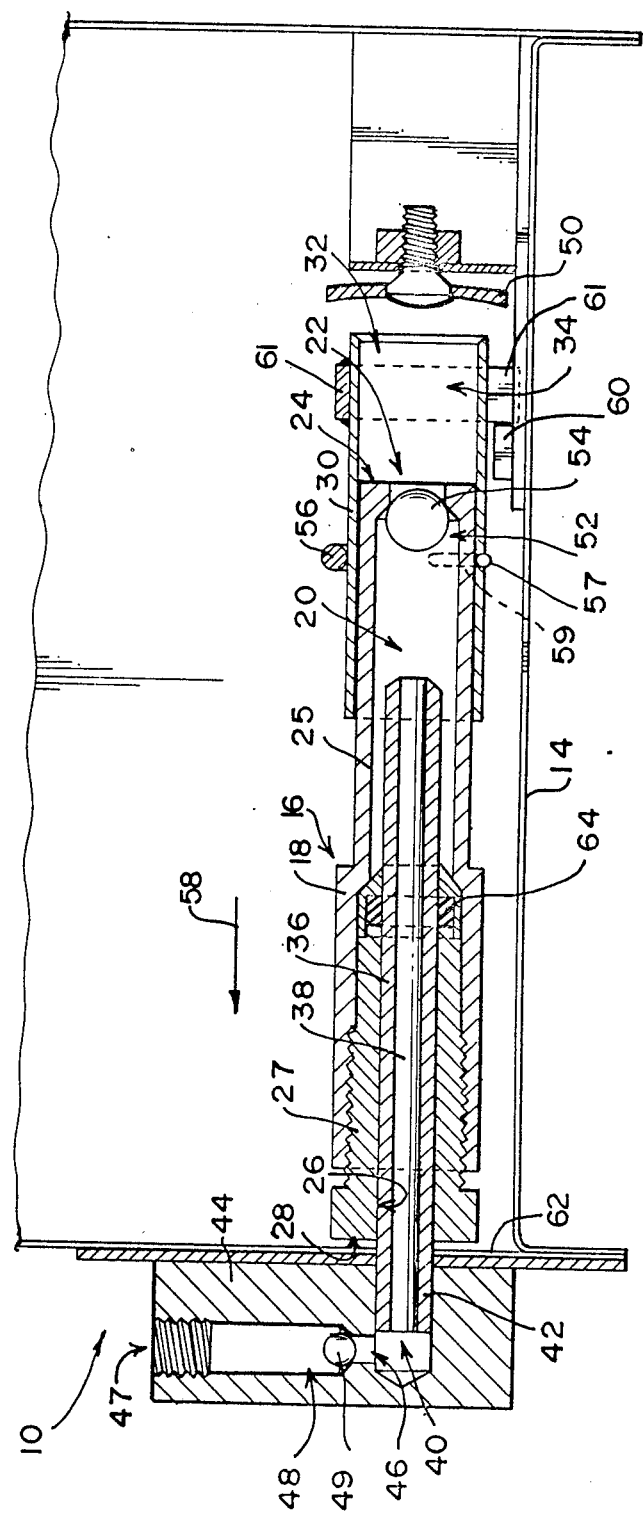
FIG. 3 shows a cross-sectional view of the apparatus of FIG. 1 in an operative configuration illustrating the opposite limit position of the complete stroke of the apparatus.
Figure 4:
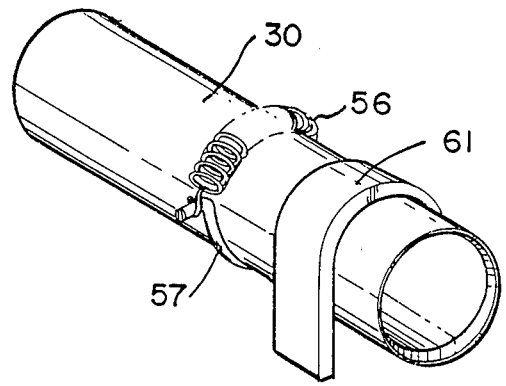
FIG. 4 shows a view in perspective of the sleeve of the apparatus of FIG. 1.

It will be appreciated from FIGS. 1, 2 and 3 that the swept volume of the chamber 34 will be greater than the swept volume of the chamber 20. As such, during the displacement of the body 18 in the opposite direction to arrow 58 from its position as shown in FIG. 3, through its position as shown in FIG. 1, to its position as shown in FIG. 2, when the chamber 20 is fully charged, a surplus amount of grease in the chamber 34 will either slow down the displacement of the body 18 or even completely inhibit this displacement. In order to overcome this, the inlet end 32 of the tubular sleeve 30 is finished with a concave bevelled face. The force which returns the support body 18 to its starting position will then act on the grease trapped in the chamber 34 and thus build up a pressure within the chamber. The pressure will force grease under the bevel and react against the cross-sectional area of the sleeve 30, thereby overcoming the frictional force acting between the body 18 and the sleeve 30, thus displacing the sleeve away from the closure member 50 to permit the release of the excess grease from the chamber 34. This is a self regulating function and the relieving pressure will be a constant, a function of the braking force of the spring 56 acting on the friction element 57 and the cross-sectional area of the sleeve 30.

It is believed by the Applicant to be beneficial to have the above relationship between the volumes of the chambers 20 and 34, particularly because of the inherent qualities by the apparatus 10, which will often have substantial air pockets therein. The configuration shown will provide for compression of these air pockets in chamber 34 resulting in the quicker expulsion of air pockets from the container, and the more effective charging of the chamber 20, on a continuous basis, of grease by means of the apparatus 10.

Figure 5:
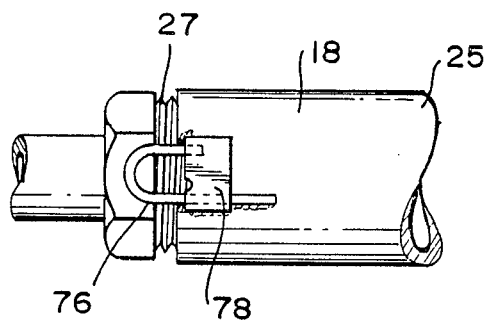
FIG. 5 shows a side view of a part of the apparatus of FIG. 1, for illustrating the operation of the manually operable displacement means of the apparatus.
Figure 6:
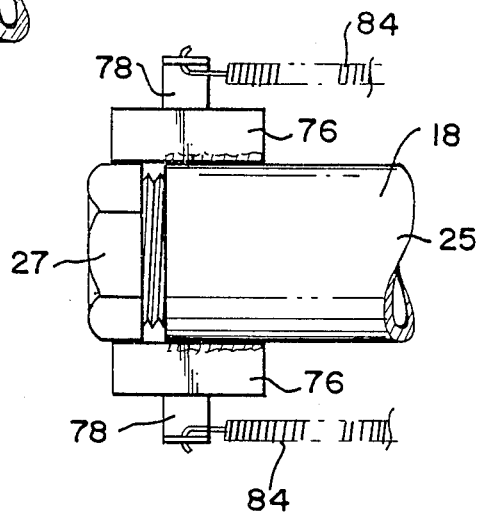
FIG. 6 shows a plan view of the part of the apparatus as shown in FIG. 5.
Figure 7:
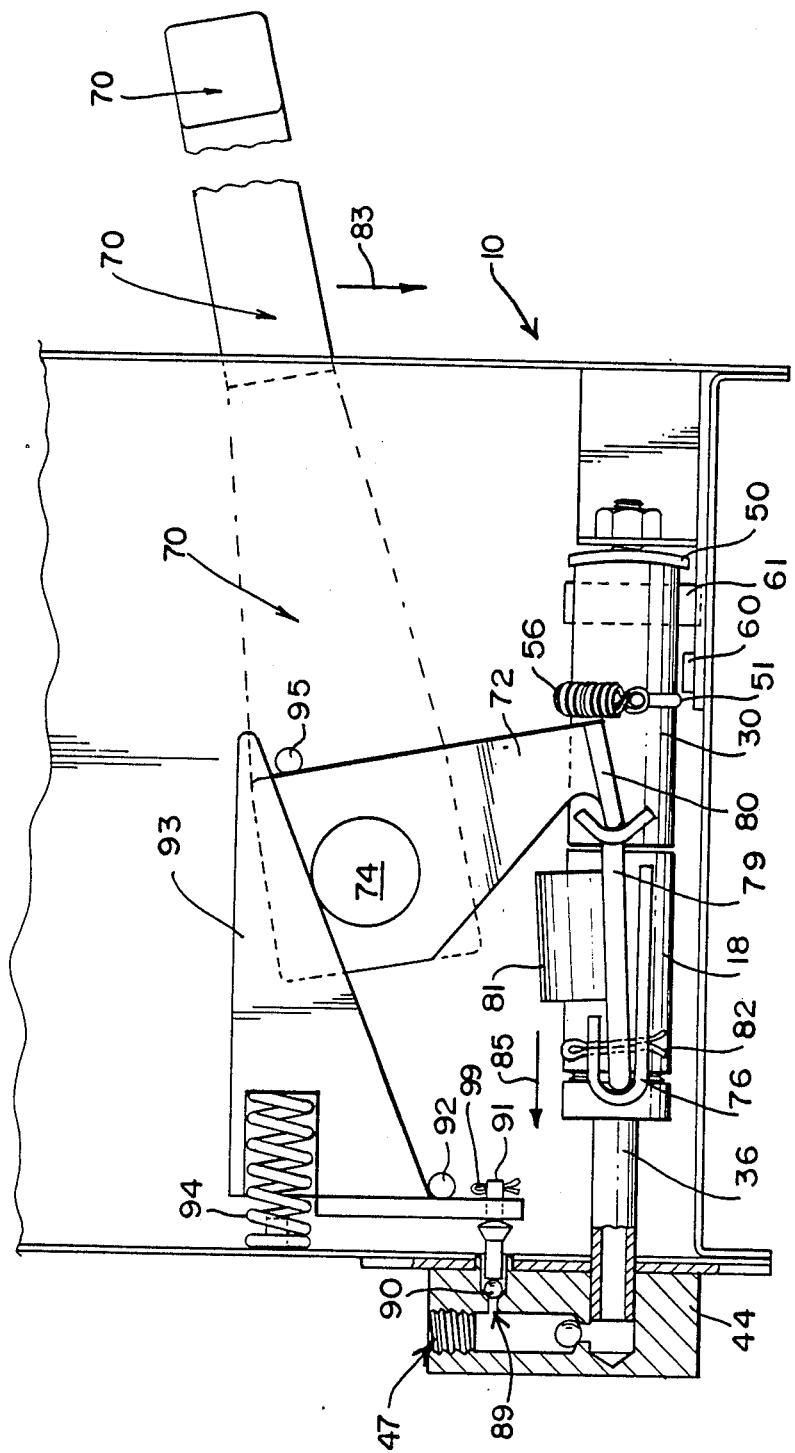
FIG. 7 shows a side view of the manually operable displacement means for the apparatus of FIG. 1.

The displacement of the support body 18 can be effected by any suitable displacement means which is manually or otherwise operable. Referring to FIGS. 5 to 7, according to a preferred embodiment of the invention, a spring loaded lever arrangement is provided that is foot operable, the lever arrangement including lever arms 70 that are pivotally displaceable and extend from the container 12, to be foot operable from a location on the exterior side of the container 12. The lever arms 70 are secure with two operating members 72 disposed on opposite sides of the support body 18, the members 72 being pivotally located within the container 12 by means of a cross shaft 74 that can be secured within the container 12 in any suitable manner. The cross shaft 74 is rotatably secured within the walls of the container extending therefrom on opposite sides thereof, the lever arms 70 being secured to the shaft 74 near opposite ends thereof where they project from the container 12.

The support member 18 has two engagement formations 76 secured on opposite sides thereof together with spring engagement elements 78, the arrangement of the engagement formations 76 and the lever arrangement being such that the operating members 72 can act on the engagement formations 76 via two push rods 79 that are locatable between operating formations 80, defined by the operating members 72, and the engagement formations 76. The push rods 79 are linked by an arch 81 and are secured to the engagement formations 76 by means of split pins 82 as is clearly illustrated in FIG. 7.

As is also clear from FIG. 7, with the operating arms 70 being disposed as described and by displacing them in the direction of arrow 83, the engagement formations 76 and therefore the support body 18 will be displaced in the direction of arrow 85 which is equivalent to the direction illustrated by arrow 58 and which will therefore permit the operation of the pressure stroke of the apparatus 10. Two tension springs 84 act between the spring engagement elements 78 and the container 12, these springs 84 providing for the return displacement of the support member 18 in an opposite direction to the arrows 85 and 58. Displacement in the direction of arrow 85 is therefore carried out as a result of manual force being applied to the operating arm 70, against the urging force for the springs 84, while as the operating arm 70 is released, reverse displacement takes place as a result of the action of the springs 84 on the support body 18. The exact location of the displacement arrangement as described with reference to FIGS. 5 to 7 is not illustrated in FIGS. 1 to 3, for the sake of clarity.

It will be appreciated that alternative arrangements can also be provided for reciprocably displacing the support body 18 as is required for the effective operation of the apparatus 10. Another feature that is considered variable by the Applicant relates to the required release of excess grease from the chamber 34. Other embodiments may typically include holes or gaps of relatively small size that can permit such excess grease to be released from the chamber 34. For example, suitable holes may be provided in the wall of the tubular sleeve 30 or closure member 50 or, alternatively, a suitable gap may be provided between the tubular sleeve 30 and the body 18 through which excess grease can be forced. Yet alternatively, the closure member 50 may be rendered suitably displaceable, when excess pressure acts thereon, to permit the release of excess grease from the chamber 34. In a further embodiment (not shown) excess grease can escape through an imperfect seal between the end 32 of the sleeve 30, and the closure member 50.

The apparatus 10 may optionally also include a pressure relief valve that can relieve the pressure of grease acting within the delivery port 47, whenever this may be necessary. For this purpose a passage 89 may lead from the port 47, back into the container 12, a ball 90 being located in the passage 89 for acting as a closure member, as illustrated in FIG. 7. An operating pin 91 acts on the ball 90 via a rocker lever 93, which pivots about a shaft 92, also mounted within the container 12. A spring 94 in turn acts on the lever 93 as shown, this spring effectively determining the force acting on the ball 90 and, as such, the maximum pressure that can occur within the port 47, beyond which a pressure release will occur and grease within the port 47 will be discharged into the container 12. The above is clearly a safety feature and will be useful to prevent accidents that may occur during operation of the apparatus 10 when blockages, such as nozzle blockages, occur downstream from the port 47.

The lever 93 can also be acted on by the lever arm 70 via the operating member 72 and a cross shaft 95 fixed between them. By "lifting" the arm 70, the cross shaft 95 comes into contact with lever 93, and as this continues, lever 93 will pivot about the shaft or pin 92 in a counter clockwise direction, thereby compressing spring 94 and releasing the force imposed on the ball 90 by the pin 91. A pressure release from the port 47 via the passage 89 is thereby permitted. Hence, these components provide a means for effecting manual release or override of the pressure relief valve, which is often required, since in practice a hose (not shown) is connected to the port 47. The other end of this hose is provided with a standard hydraulic coupler or connector (not shown) which can engage a grease nipple (not shown). The hydraulic coupler is hence locked and sealed to the grease nipple due to the pressure in the hose. An excess pressure, however, often remains in the hose after a greasing operation has been performed, and it would then be very difficult to remove the hydraulic coupler from the grease nipple due to the excess pressure remaining in the hose. It would then usually be necessary for an operator to oscillate vigorously the hydraulic coupler to break the "seal" and thus release the excess pressure in the hose, thereby to permit the hydraulic coupler to be uncoupled from the grease nipple. However, with the manual release or override of the present invention, this can be effected easily and readily merely by "lifting" the arms sufficiently to relieve the force imposed on the ball 90. The excess pressure imparted by grease in the hose and the port 47 is then released via the passage 89, thereby ensuring easy removal of the hydraulic coupler from the grease nipple. The Applicant believes that this will also lead to improved service life of the connector and grease nipples.

It will be understood that the specific configuration of the apparatus 10 as above described can be varied in various different respects while still including the essential principles of the invention as defined, and the invention accordingly extends also to such alternative configurations.

What I claim is:

1. An apparatus for displacing a high viscous substance, which apparatus comprises
   an elongate support body defining a first chamber therein, an inlet opening defined at one end of said support body leading into said first chamber and an elongate passage leading into said first chamber from the opposite end of said support body;
   a tubular sleeve that is slidably located on said support body and defines an inlet end which can extend beyond the end of said support body inlet opening, a second chamber being defined by said tubular sleeve between its inlet end and the end of said support body located within said tubular sleeve, the volume of said second chamber being variable through the displacement of said support body with respect to said tubular sleeve;
   an elongate rod located within the passage defined by said support body, so that said support body is slidably located on said rod, said rod defining an elongate passage therein leading from an inlet end, at one end of said rod which is in direct communication with said first chamber defined by said support body, and outlet end, defined near the opposite end of said rod where it extends from said support body, said rod being disposed so that it can extend into said first chamber by the suitable displacement of said support body located thereon;
   a one-way control valve located within said support body, being operable to permit the displacement of a high viscous substance into said first chamber, defined by said support body, from said second chamber, defined by said tubular sleeve, and inhibit displacement of such a substance in an opposite direction;
   a closure member for blocking-off the inlet end of said tubular sleeve at a predetermined position thereof;
   a first displacement control means which permits initial displacement of said tubular sleeve together with said support body away from said closure member for a limited distance, so that the inlet end of said tubular sleeve is thereby displaced from said closure member, and thereafter inhibits displacement of said tubular sleeve while displacement of said support body with respect to said tubular sleeve can occur; and
   manually operable second displacement means for reciprocably displacing said support body with respect to said tubular sleeve and said rod.

2. An apparatus according to claim 1, wherein said one-way control valve located within said support body comprises spring loaded ball valve that can seat on a valve seat defined by the inlet opening leading into said first chamber of said support body.

3. An apparatus according to claim 1, wherein said closure member for blocking-off the inlet end of said tubular sleeve comprises a formation that defines a sealing surface that opposes said tubular sleeve and can sealingly engage said tubular sleeve to thereby block-off the inlet end thereof.

4. An apparatus according to claim 1, wherein said first displacement control means comprises a control element which mechanically engages said tubular sleeve and frictionally engages said support body so that said tubular sleeve will ordinarily move with said support body when displaced with respect to said elongate rod, said first displacement control means further comprising a stop member, which is secure with said container, and which can engage either said tubular sleeve or said control means to thereby inhibit further displacement of said tubular sleeve away from said closure member after initial displacement thereof, while displacement of said support body can continue in the same direction.

5. An apparatus according to claim 1, which further comprises a container, for containing a high viscous substance, and a mounting formation secured to said container near its operative bottom end, said mounting formation mounting the free end of said elongate rod onto said container in a configuration in which said support body and said tubular sleeve are located within said container and the outlet end of the passage in said rod is located outside said container.

6. An apparatus according to claims 5, wherein said closure member is secured to said container at a location where it will block-off the inlet end of said tubular sleeve, with said support body displaced into a position with respect to said elongate rod in which said rod does not extend, or only extends marginally, into said first chamber defined by said support body, so that the volume of said first chamber is at its operative maximum, whereas the volume of said second chamber is at its operative minimum.

7. An apparatus according to claim 5, wherein said mounting formation comprises an outlet formation which is in communication with the outlet end of the passage defined by said rod, said outlet formation being connectable to a suitable conduit through which a high viscous substance can be displaced from said container towards a required location.

8. An apparatus according to claim 7, wherein said outlet formation comprises a one-way valve located therein which can control the passage of a high viscous substance from said container via said outlet formation and inhibit the return flow of the substance.

9. An apparatus according to claim 8 which further comprises a pressure relief valve for relieving excess pressure in said outlet formation when the pressure in said outlet formation exceeds a predetermined valve, with said pressure relief valve being located downstream of said one-way valve; and means for manually activating said relief valve to release excess pressure in said outlet formation.

10. An apparatus according to claim 1, wherein said manually operable second displacement means comprises an arrangment that engages said support body and includes an operating arm which projects to an accessible location where, in the operative configuration of the apparatus, said operating arm is displaceable to provide for reciprocable displacement of said support body.

11. An apparatus according to claim 1, wherein said second displacement means comprises a lever arrangement having a lever arm that is pivotally displaceable, in the operative configuration of the apparatus, and through its pivotal displacement will provide reciprocal displacement of said support body.

12. An apparatus according claim 10, wherein said second displacement means is foot-operable.

13. An apparatus according to claim 1, wherein the maximum volume of said first chamber defined by said support body is smaller than the maximum volume of said second chamber defined by said tubular sleeve, and a release means is provided for releasing excess high viscous substance from said second chamber during charging of said first chamber, in use of the apparatus.

14. An apparatus according to claim 13, wherein said release means comprises a concave bevelled front face of said tubular sleeve, which face defines the inlet end of said tubular sleeve, this bevelled front face being disposed so that pressure of substance within said second chamber can act thereon to displace it away from said closure member and thereby permit release of excess substance from said second chamber via a gap so formed between said closure member and the inlet end of said tubular sleeve.

* * * * *